Patented May 10, 1932

1,858,017

UNITED STATES PATENT OFFICE

LEON LILIENFELD, OF VIENNA, AUSTRIA

PROCESS OF MAKING ALKALI CELLULOSE

No Drawing. Application filed February 16, 1922, Serial No. 537,062, and in Austria August 1, 1919.

In this specification, and in the claims subjoined, the expression "cellulosic bodies" is used to designate cellulose, materials containing substantial proportions of cellulose, alkali-soluble and insoluble cellulose hydrates, hydrocelluloses and oxycelluloses, compounds of cellulose with alkali (alkali cellulose), compounds of cellulose hydrate with alkali, compounds of hydrocelluloses with alkali, esters of cellulose. This expression also includes the foregoing bodies partially etherified, i. e. ethers of lower degrees of etherification. The expression "ethers" means alkyl derivatives, or aralkyl derivatives, the expression "to etherify" means to alkylate or to aralkylate, the expression "etherifying agents" means alkylating or aralkylating agents and the expression "etherification" means alkylation or aralkylation.

This invention relates to the manufacture of alkali compounds of cellulosic bodies or of mixtures of cellulosic bodies with alkali suitable for making cellulose ethers. The object of my invention is to provide an improved way of preliminarily preparing certain of the ingredients so that they function better during the etherification process so as to produce ethers of cellulosic bodies which will yield strong flexible transparent sheets or films or other objects. Other objects will hereinafter appear.

It has been proposed to manufacture cellulose ethers by reacting on an intimate mixture of cellulose and alkali (hereinafter referred to as "alkali cellulose") with an etherifying agent, small amounts of water being present in the preferred mode of operation. According to the nature of the etherifying agent the etherification may be performed in open vessels or in vessels provided with reflux condensers or in pressure vessels such as autoclaves and the like. The vessels are suitably heated and the contents agitated during the time of the reaction.

It has been found that the possibility of obtaining strong, flexible and transparent films, coatings, artificial filaments, insulating materials, celluloid-like masses and the like, from such ethers depends to an unexpected degree upon the manner and thoroughness with which the alkali (and the water if the latter is used) is mixed with the cellulosic bodies prior to etherification. If the mixture is not thorough, whitish fibers, particles, or haze appear in the finished articles, and the strength and homogeneity are liable to be relatively poor. This is the undesirable result which occurs, for example, when the cellulosic bodies, the alkali and the water are charged into an ordinary chemical mixer with slowly moving blades or paddles.

I have discovered that cellulosic bodies and alkali, or cellulosic bodies, alkali and water, may be entirely mixed to the necessary degree (for the production of transparent films and other articles) by subjecting these ingredients to a violent and drastic mixing treatment.

For producing the best results, it is very essential that the mixing be conducted under such conditions as to give a very thorough and complete mixing, and to bring together with each particle of the cellulosic body, in a finely divided state, a particle of caustic alkali and these also preferably in the presence of a small particle of water. For obtaining the best results, the mixing should be such as to produce a very uniform and homogeneous product. Such a uniform and homogeneous mixture cannot be produced merely by stirring or stirring and sifting the materials, nor by simply tumbling the materials together in a tumbling drum, but it is necessary to knead together under pressure, or to rub up well in a grinding machine in which pressure or like strong forces operate, to give the desired homogeneity to the product.

As stated in my copending application Ser. No. 436,604, filed January 11, 1921, (corresponding to Austrian application filed August 1, 1919) and of which the present case is a continuation in part, 100 parts by weight of cellulose carrying 80 to 100 parts by weight of an 18% NaOH solution (65.6 to 82 parts of $H_2O$ and 14.4 to 18 parts NaOH) are mixed with 200 to 300 parts by weight of caustic soda (dry powder) by being ground up, stirred, kneaded, shredded etc., in an edge runner, preferably during cooling, until a completely uniform, fine fibrous or pulverulent mixture is obtained. This result may be secured by running the mass in an edge runner for a considerable period of time. An edge runner is an excellent machine for this purpose, as it combines a rolling action, a pressing action, a kneading action, a mixing action and a rubbing action, all practically simultaneously, whereby great homogeneousness of composition in the product can be produced. It is necessary to obtain the utmost homogeneity and uniformity in the product of the mixing, in order to produce the best results in the subsequent etherification (alkylation, aralkylation or arylation) operation. With an edge runner of the ordinary type 1–5 hours running will give good results.

Other machines can be similarly employed, such as a willowing machine, a shredder, a kneading machine, a mortar and pestle or machines giving a tearing action or a crunching action, or a masticating or malaxating action.

The invention is particularly suitable in cases where cellulosic bodies are to be mixed with a large amount of alkali and a small amount of water or other aqueous fluid, particularly as in the above example, where less of the latter is to be used than will dissolve the amount of caustic alkali present.

In many cases, the cellulosic bodies can first be soaked in an alkali solution, for a time, then the excess of solution removed.

*Example 2.*—100 kilogrammes cellulose is impregnated with 500 to 1000 kilogrammes of a 30% caustic soda solution and allowed to stand for a suitable period, for example 6–48 hours.

It is then pressed, separated or filtered by suction till it has a weight of 180 to 240 kilogrammes, (theoretically containing 56 to 98 kgs., $H_2O$ and 24 to 52 kgs., NaOH), and the pressed material finely divided, preferably under cooling, after which 200 to 300 kgs. of dry powdered NaOH is added, and the mixture kneaded and torn, in a kneading machine having rotary tearing knives, for say 1–5 hours, to give a homogeneous and uniform pulverulent or flocculent mass.

As stated in my copending application 464,357, filed April 25, 1921 (corresponding to an Austrian application filed May 5, 1920, and of which application the present case is a continuation in part) finely divided cellulose (i. e. cellulose in the form of a flour or fine powder) can be mixed with caustic soda and water (the latter being in amount insufficient to dissolve the amount of caustic alkali) and mixed and rubbed down, ground, kneaded etc. to complete homogeneity. The ingredients of the mixture can be added in any order, one or two together or all three together. The procedure may be carried out either by adding to the solid caustic alkali, water or a solution of a caustic alkali and then the carbohydrate, or the carbohydrate may be mixed with the solid caustic alkali, water or caustic alkali solution being added if required. It is also possible to treat the carbohydrate with water or caustic alkali solution and then to incorporate the solid caustic alkali with the mixture. In all cases, where the work is not carried out with the exclusion of air, e. g. in vacuo, or in an atmosphere of inert gas, a larger or smaller quantity of the water can be taken up from the air.

This latter operation is of some importance. By mixing the dry cellulose (or cellulose containing a normal degree of moisture, say 7 to 15%) with the caustic alkali and running the mixture in a grinding and kneading machine, while allowing a current of moist air to travel through the said machine, the desired amount of moisture may be taken up, due to the hygroscopic nature of caustic soda. This, of course, would involve the calculation of the degree of humidity of the air and the volume of air passing through the machine per hour. When it is figured that a sufficient absorption of moisture has been taken up, the air inlet can be closed, while the machine is allowed to grind and knead the mixture until homogeneity is effected.

As stated in my copending application 436,380, filed January 10, 1921 (corresponding to an Austrian application filed August 6th, 1919, and of which application the present case is a continuation in part) ethers of cellulosic bodies of lower degrees of etherification or reaction mixtures containing such ethers and usually representing a dense cheesy pasty mass or a substance dry to the touch, can be mixed with caustic alkali in the absence of water or in the presence of limited amounts of water and rubbed, stirred or kneaded, until a completely uniform mass is obtained. This result may be secured by treating the mass in a shredder, an edge runner, a kneading machine, a mortar and pestle, in short, in an apparatus giving a crunching or masticating or malaxating action. The alkali may be added either all at once or in small portions. Too great a rise of temperature during the addition of, and the mixing with, the alkali is preferably to be avoided. As stated in my copending application 436,380, this process may be carried out with calculated quantities of alkali or with considerable excesses of alkali.

As stated in said prior cases, the best results are secured when the mixing and grinding is at a low temperature, say at or below room temperature, and preferably at as low as 10° C., or even lower, by artificial cooling.

The proportions herein involved, without reference to the violent and positive pressure, are claimed in my copending application 436,604, filed January 11, 1921; the etherifying of the alkali cellulose produced as herein described is claimed in my copending case 611,516, filed January 8, 1923, and the process which comprises mixing carbohydrates with water and alkali in the proportions as herein described and subsequently etherifying is claimed in my copending case 464,357, filed April 25, 1921.

I claim:

1. A process of subjecting to a mechanical kneading operation, a mixture of 100 parts of a cellulosic body and over 200 parts of caustic alkali, together with insufficient aqueous fluid to dissolve the latter, until a homogeneous flocculent to pulverulent mass is produced.

2. A process of producing alkali compounds of cellulosic bodies from a solid alkali, an aqueous material and cellulose, which comprises subjecting the same to violent and positive mechanical pressure during the step of mixing the same, and continuing such operation until a complete intermingling of said ingredients is effected.

3. A process of producing alkali compounds of cellulosic bodies from a solid alkali, an aqueous material and cellulose, which comprises subjecting the same to violent and positive mechanical pressure during the step of mixing the same, and continuing such operation until a complete intermingling of said ingredients is effected, the amount of such solid caustic alkali being substantially more than can be dissolved by the amount of aqueous material present.

4. A process of producing mixtures of cellulosic bodies with alkalies from a solid alkali, an aqueous material and a cellulosic material, which comprises subjecting the same to violent and positive mechanical pressure during the step of mixing the same, and continuing such operation until a complete intermingling of said ingredients is effected, the amount of such solid caustic alkali being substantially more than can be dissolved by the amount of aqueous material present.

5. A process which comprises grinding a cellulosic body and caustic alkali, while air of known moisture content is passed through, in such total volume as to allow absorption of sufficient water to complete the formation of alkali cellulose, but not sufficient to dissolve the whole of the alkali.

6. A process which comprises grinding a cellulosic body and caustic alkali, while air of known moisture content is passed through, in such total volume as to allow absorption of sufficient water to complete the formation of alkali cellulose.

7. A process which comprises subjecting to violent mechanical disruption, a mixture containing a cellulosic body and solid caustic alkali.

8. A process which comprises subjecting to violent mechanical disruption, a mixture containing a cellulosic body and solid caustic alkali, until the entire mass is converted into a flocculent to pulverulent mass.

9. The steps of grinding and rubbing together, a mixture of 100 parts of cellulose, not over 100 parts of water and substantially over 100 parts of solid caustic soda.

10. The steps of grinding and rubbing together, a mixture of 100 parts of cellulose, not over 100 parts of water, and substantially over 100 parts of solid caustic soda, while cooling the mass under treatment.

11. The steps of grinding and rubbing together, a mixture of 100 parts of cellulose, not over 100 parts of water, and substantially over 200 parts of solid caustic soda.

12. In the process of making cellulose ethers the improvement which comprises, rubbing together alkali, water, and cellulosic material containing unetherified hydroxyl groups until a powder is produced, from which powder cellulose ethers can be made by subjecting to the action of an etherifying agent.

13. In the process of making cellulose ethers, the improvement which comprises subjecting to violent mechanical disruption, a mixture comprising a cellulosic material containing unetherified hydroxyl groups and an alkali, thereby producing a material from which cellulose ethers can be made by subjecting the disrupted mixture to an etherifying agent.

In testimony whereof I affix my signature.

Dr. LEON LILIENFELD.